(12) United States Patent
Akkapeddi et al.

(10) Patent No.: US 10,208,200 B2
(45) Date of Patent: Feb. 19, 2019

(54) DUAL OXYGEN-SCAVENGING COMPOSITIONS REQUIRING NO INDUCTION PERIOD

(71) Applicant: GRAHAM PACKAGING COMPANY, L.P., Lancaster, PA (US)

(72) Inventors: Murali K. Akkapeddi, York, PA (US); Brian A. Lynch, Merrimack, NH (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 40 days.

(21) Appl. No.: 15/474,254

(22) Filed: Mar. 30, 2017

(65) Prior Publication Data

US 2018/0282537 A1    Oct. 4, 2018

(51) Int. Cl.
*C08L 67/02* (2006.01)
*B65D 81/26* (2006.01)

(52) U.S. Cl.
CPC ........... *C08L 67/02* (2013.01); *B65D 81/266* (2013.01); *C08K 2201/012* (2013.01); *C08L 2201/08* (2013.01); *C08L 2201/10* (2013.01)

(58) Field of Classification Search
CPC ... C08L 67/02; C08L 2201/08; C08L 2201/10
USPC ........................................................ 524/377
See application file for complete search history.

(56) References Cited

U.S. PATENT DOCUMENTS

| | | | |
|---|---|---|---|
| 3,028,366 A | 4/1962 | Engle, Jr. et al. | |
| 4,107,149 A | 8/1978 | Bier et al. | |
| 4,536,409 A | 8/1985 | Farrell et al. | |
| 4,824,895 A | 4/1989 | Rosenfeld | |
| 5,021,515 A | 6/1991 | Cochran et al. | |
| 5,049,624 A | 9/1991 | Adams et al. | |
| 5,075,362 A | 12/1991 | Hofeldt et al. | |
| 5,211,875 A | 5/1993 | Speer et al. | |
| 5,302,430 A | 4/1994 | Ardéchir et al. | |
| 5,639,815 A | 6/1997 | Cochran et al. | |
| 5,955,527 A | 9/1999 | Cochran et al. | |
| 5,962,625 A | 10/1999 | Yau | |
| 6,083,585 A | 7/2000 | Cahill et al. | |
| 6,254,803 B1 | 7/2001 | Matthews et al. | |
| 6,423,776 B1 | 7/2002 | Akkapeddi et al. | |
| 6,455,620 B1 | 9/2002 | Cyr et al. | |
| 6,558,762 B2 | 5/2003 | Cahill et al. | |
| 7,396,865 B2 | 7/2008 | Tsuji et al. | |
| 2004/0013833 A1 | 1/2004 | Lee et al. | |
| 2004/0043172 A1 | 3/2004 | Schmidt et al. | |
| 2004/0044118 A1 | 3/2004 | Waddell et al. | |
| 2006/0148957 A1 | 7/2006 | Stewart et al. | |
| 2006/0180790 A1 | 8/2006 | Deshpande et al. | |
| 2008/0075965 A1 | 3/2008 | Dershem | |
| 2008/0161529 A1 | 7/2008 | Jenkins et al. | |
| 2008/0277622 A1 | 11/2008 | Deshpande et al. | |
| 2009/0278087 A1 | 11/2009 | Deshpande et al. | |
| 2010/0154361 A1 | 6/2010 | Deshpande et al. | |
| 2011/0123741 A1 | 5/2011 | Deshpande | |
| 2011/0275742 A1 | 11/2011 | Akkapeddi et al. | |
| 2012/0114887 A1 | 5/2012 | Drbohlav, III et al. | |
| 2012/0214935 A1 | 8/2012 | Roodvoets et al. | |
| 2012/0283366 A1 | 11/2012 | Akkapeddi et al. | |
| 2013/0306905 A1 | 11/2013 | Akkapeddi et al. | |
| 2015/0197623 A1* | 7/2015 | Akkapeddi ......... | B65D 81/267 252/188.28 |

FOREIGN PATENT DOCUMENTS

| | | |
|---|---|---|
| EP | 1 911 606 | 4/2008 |
| WO | 01/14452 | 3/2001 |
| WO | 2010/042125 | 4/2010 |
| WO | 2016/123330 | 8/2016 |

OTHER PUBLICATIONS

Catalytic Technologies, "Nov. 2014—CTL Ti-PET bottles show improved oxygen barrier properties", Nov. 4, 2014. Retrieved from http://ctl8.com/november-2014-ctl-ti-pet-bottles-show-improved-oxygen-barrier-properties/ on Mar. 23, 2016.

Hu, Y.S. et al., "Improving Oxygen Barrier Properties of Poly(ethylene terephthalate) by Incorporating Isophthalate. II. Effect of Crystallization" Journal of Applied Polymer Science 2005, 98, 1629-1642.

Resano et al., "Direct determination of phosphorus in two different plastic materials (PET and PP) by solid sampling-graphite furnace atomic absorption spectrometry" J. Anal. At. Spectrom., 2000, 15, 1383-1388.

Thiele et al., "Quo vadis polyester catalyst?" Chemical Fibers International, vol. 54, Jun. 2004, pp. 162-163.

Weissman, Dan, "Catalysing PET" Reprinted from Plastics in Packaging, Jul. 2014, pp. 22-23.

International Search Report and Written Opinion dated Apr. 5, 2018 by the European Patent Office in its capacity as International Searching Authority of counterpart international patent application No. PCT/US2018/014226.

* cited by examiner

*Primary Examiner* — Hui H Chin

(74) *Attorney, Agent, or Firm* — Stradley Ronon Stevens & Young, LLP

(57) ABSTRACT

A composition comprising: a polyester base polymer; a blend of two distinct polyether-based oxygen scavenging additives, OS1 and OS2, wherein each of OS1 and OS2 is selected from the group consisting of a polyether diol, an ester end-capped derivative of a polyether diol, a polyether-polyester block copolymer, and an ether end-capped derivative of a polyetherdiol, wherein OS1 has a molecular weight of from 10,000 to 100,000 and OS2 has a molecular weight of from 200 to 5,000; and a transition metal catalyst.

35 Claims, 1 Drawing Sheet

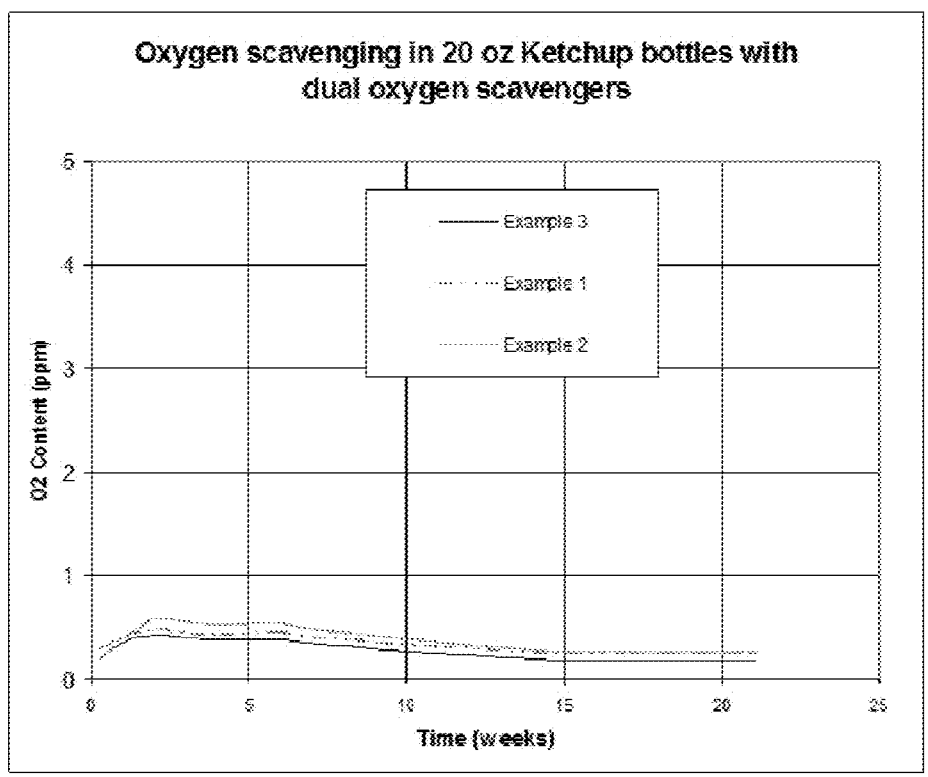

DUAL OXYGEN-SCAVENGING COMPOSITIONS REQUIRING NO INDUCTION PERIOD

BACKGROUND OF THE INVENTION

The present invention relates to compositions useful for oxygen scavenging, particularly to substantially transparent compositions including a polyester base polymer, a blend of oxidizable polyether-based additives, and a transition metal salt as an oxidation catalyst. The polyester containers made therefrom have improved mechanical properties such as, for example, improved impact strength.

All references, including publications, patent applications, and patents, cited herein are hereby incorporated by reference to the same extent as if each reference were individually and specifically indicated to be incorporated by reference and were set forth in its entirety herein.

It is well known that oxygen-sensitive food products such as tomato-based ketchups and sauces, and beverage products such as orange juice, beer, and green tea, require a packaging material that has either high oxygen barrier properties or the ability to block any oxygen ingress so as to preserve the freshness and flavor of the packaged contents. Traditionally, metal and glass packaging (e.g., cans or jars) has been used as oxygen-impervious containers.

However, in recent years, plastic containers, and more particularly injection stretch blow molded polyethylene terephthalate (PET) containers have made significant inroads into packaging, replacing the metal and glass containers for at least reasons of better economics, lighter weight, increased breakage resistance, and better consumer acceptance. Such PET containers have indeed enjoyed widespread use in packaging at least because the biaxial orientation of PET polymer chains leads to a unique combination of clarity, toughness and moderate gas barrier properties.

In barrier layers of packaging walls that are made from blends of oxygen scavenging materials with base polymer resins such as PET, a significant haze can result due to such factors as: the immiscibility of the scavenging materials with the base polymer resins, and the inability to create by mechanical blending means disperse-phase domains that are so small as not to interfere with the passage of light therethrough; and the adverse influence of the scavenging material on the crystallization behavior of PET base resin. One approach to minimizing such haze is careful selection of base resin to improve dispersibility of the scavenger material and, thus, reduce, but not substantially eliminate, haze; and to minimize the adverse crystallization effect. This approach may undesirably narrowly restrict the choice of base polymer resin. Another approach is to use compositions that serve as compatibilizers to reduce haze. These approaches add cost to the layer and the compatibilizer adds an additional material that must be evaluated for its suitability for contact with food.

Barrier materials based on polyether-polyester block copolymers have been developed that are compatible with PET and, thus, form substantially clear containers when blended with PET and blow molded into containers and which provide high oxygen scavenging capability. Such containers, however, suffer from a significant drawback in that upon impact, they become hazy. Thus, there is a need in the art for effective oxygen scavenging compositions that satisfy container clarity requirements and the impact damage-resistance requirement.

BRIEF SUMMARY OF THE INVENTION

Embodiments of the present invention include a composition comprising: a polyester base polymer; a blend of two distinct polyether-based oxygen scavenging additives, OS1 and OS2, wherein each of OS1 and OS2 is selected from the group consisting of a polyether diol, an ester end-capped derivative of a polyether diol, a polyether-polyester block copolymer, and an ether end-capped derivative of a polyetherdiol, wherein OS1 has a molecular weight of from 10,000 to 100,000 and OS2 has a molecular weight of from 200 to 2,900; and a transition metal catalyst.

The oxidizable polyether-based additives each have the general formula X—[R—O]$_n$—R'—Y, where R is a substituted or unsubstituted alkylene chain having from 2 to 10 carbon atoms; n ranges from 4 to 100; X and Y are selected from the group consisting of: H, OH, —OCOR$_1$, —OCOAr$_1$—OR$_1$ and —OAr$_1$; and R' may be the same as R or selected from the group consisting of —[COR$_2$COOR$_3$O]$_p$— and —[COAr$_2$COOR$_3$O]$_p$—. R$_1$ is an alkyl group having from 2 to 18 carbon atoms, Ar$_1$ is an aryl group, Ar$_2$ is a phenylene or naphthylene group, R$_2$ and R$_3$ are C$_2$ to C$_{18}$ alkylene groups, and p ranges from 10 to 100. The oxidizable polyether-based additives are preferably selected from polyether diols, ester capped derivatives of polyether diols, polyether-polyester block copolymers, and ether-capped derivatives of polyetherdiols (e.g., α,ω-polyether diethers).

The transition metal catalyst preferably is a transition metal salt of cobalt. The cation of the transition metal salt is preferably a carboxylate cation. In a preferred embodiment, the transition metal salt is cobalt neodecanoate.

Another embodiment of the present invention includes a wall for a package having at least one layer. The layer is made of a composition comprising: a polyester base polymer; a blend of two distinct polyether-based oxygen scavenging additives, OS1 and OS2, wherein each of OS1 and OS2 is selected from the group consisting of a polyether diol, an ester end-capped derivative of a polyether diol, a polyether-polyester block copolymer, and an ether end-capped derivative of a polyetherdiol, wherein OS1 has a molecular weight of from 1,000 to 10,000 and OS2 has a molecular weight of from 200 to 2,900; and a transition metal catalyst.

BRIEF DESCRIPTION OF THE DRAWINGS

FIG. 1 is a graph of oxygen scavenging performance of containers of the present invention.

DETAILED DESCRIPTION OF THE INVENTION

Embodiments of the present invention include compositions that are useful in the manufacture of packaging for oxygen-sensitive materials. In some embodiments, the composition includes a polyester base polymer, a blend of oxidizable polyether-based additives, and a transition metal salt as an oxidation catalyst, wherein the composition exhibits excellent oxygen scavenging properties as well as excellent clarity (i.e., lack of haze) when blow molded, for example, from a preform into, for example, a monolayer container via an injection stretch blow molding process as well as upon and after impact.

1) Polyester Base Polymer

In preferred embodiments, the base polymer is a polyester. Examples of suitable polyester polymers include polyethylene terephthalate homopolymers and copolymers of polyethylene terephthalate modified with one or more polycarboxylic acid modifiers and hydroxyl compound modifiers (collectively, "PET"), polyethylene naphthalate homopolymers and copolymers of polyethylene naphthalate modified with one or more polycarboxylic acid modifiers and hydroxyl compound modifiers ("PEN"), and blends of PET and PEN. A suitable PET or PEN polymer may include the one or more polycarboxylic acid modifiers in a cumulative amount of less than about 15 mole %, or less than about 10 mole %, or less than about 8 mole %. A suitable PET or PEN polymer may include the one or more hydroxyl compound modifiers in an amount of less than about 60 mole %, or less than about 50 mole %, or less than about 40 mole %, or less than about 15 mole %, or less than about 10 mole %, or less than about 8 mole %. A modifier polycarboxylic acid compound or hydroxyl compound is a compound other than the compound contained in an amount of at least about 85 mole %. The preferred polyester polymer is polyalkylene terephthalate, and most preferred is PET. In some embodiments, the polyester polymer contains at least about 90 mole % ethylene terephthalate repeat units, and in other embodiments, at least about 92 mole %, and in yet other embodiments at least about 94 mole %, based on the moles of all repeat units in the polyester polymers.

In addition to a diacid component of terephthalic acid, derivatives of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having about 8 to about 14 carbon atoms, aliphatic dicarboxylic acids preferably having about 4 to about 12 carbon atoms, or cycloaliphatic dicarboxylic acids preferably having about 8 to about 12 carbon atoms.

Examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "polycarboxylic acid." It is also possible for trifunctional and higher order polycarboxylic acids to modify the polyester.

The hydroxyl component is made from compounds containing 2 or more hydroxyl groups capable of reacting with a carboxylic acid group. In some preferred embodiments, preferred hydroxyl compounds contain 2 or 3 hydroxyl groups. Certain preferred embodiments have 2 hydroxyl groups. These hydroxyl compounds include $C_2$-$C_4$ alkane diols, such as ethylene glycol, propane diol, and butane diol, among which ethylene glycol is most preferred for container applications. In addition to these diols, other modifier hydroxyl compound component(s) may include diols such as cycloaliphatic diols preferably having 6 to 20 carbon atoms and/or aliphatic diols preferably having about 3 to about 20 carbon atoms. Examples of such diols include diethylene glycol; triethylene glycol; 1,4-cyclohexanedimethanol; propane-1,3-diol and butane-1,4-diol (which are considered modifier diols if ethylene glycol residues are present in the polymer in an amount of at least 85 mole % based on the moles of all hydroxyl compound residues); pentane-1,5-diol; hexane-1,6-diol; 3-methylpentanediol-(2,4); neopentyl glycol; 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

In some preferred embodiments, modifiers include isophthalic acid, naphthalenic dicarboxylic acid, trimellitic anhydride, pyromellitic dianhydride, 1,4-cyclohexane dimethanol, and diethylene glycol. The amount of the polyester polymer in the formulated polyester polymer composition ranges from greater than about 50.0 wt. %, or greater than about 80.0 wt. %, or greater than about 90.0 wt. %, or greater than about 95.0 wt. %, or greater than about 96.0 wt. %, or greater than about 97.0 wt. %, and up to about 99.90 wt. %, based on the combined weight of all polyester polymers and all polyamide polymers. The formulated polyester polymer compositions may also include blends of formulated polyester polymer compositions with other thermoplastic polymers such as polycarbonate. In some preferred compositions, the polyester comprises a majority of the composition of the inventions, and in some embodiments the polyester is present in an amount of at least about 80 wt. %, or at least about 90 wt. %, based on the weight of the composition (including the oxidizable polyether-based additive and a transition metal salt, but excluding fillers, inorganic compounds or particles, fibers, impact modifiers, or other polymers which serve as impact modifiers or which form a discontinuous phase such as may be found in cold storage food trays).

In some embodiments, the polyester base polymer is substantially free of antimony. As used herein, the term "substantially free of antimony" refers to polyester base polymers including less than about 100 ppm of antimony, preferably less than about 50 ppm, more preferably less than about 10 ppm, and most preferably from about 0 ppm to about 2 ppm. In some embodiments, the polyester base polymer is also substantially free of phosphorus. As used herein, the term "substantially free of phosphorus" refers to polyester base polymers including than about 20 ppm of phosphorus, preferably less than about 10 ppm, more preferably less than about 5 ppm, and most preferably the polyester base polymer about 0 ppm to about 1 ppm. PET polymers formed using typical antimony metal-based catalysts typically contain about 190 ppm to about 300 ppm antimony and about 20 ppm to about 100 ppm of phosphorus.

In an exemplary embodiment, the antimony-free polyester base polymer is selected from PET resins formed using titanium, germanium, or aluminum metal-based catalysts. In some embodiments, the polyester base polymer may include a blend of a low-antimony or substantially antimony-free polyester base polymer and a polyester base polymer having a greater concentration of antimony, so long as the blend has an antimony concentration below the limits described above. Examples of preferred antimony-free PET resins are selected from titanium catalyst-based PET resins such as Laser+® HS Ti 818, W Ti 844 and the aluminum catalyst-based PET resins such as Laser+® B92A (formerly Parastar 7000) available from DAK America. The polyester base polymer may preferably have an intrinsic viscosity (I.V.) ranging from about 0.5 dl/g to about 1.0 dl/g, more preferably from about 0.65 dl/g to about 0.9 dl/g and most preferably from about 0.72 dl/g to about 0.84 dl/g.

Other base polymers may be used with the instant invention. One example is polypropylene. In certain embodiments, the polyester polymers of the invention are thermoplastic and, thus, the form of the compositions are not limited and can include a composition in the melt phase polymerization, as an amorphous pellet, as a solid stated polymer, as a semi-crystalline particle, as a composition of matter in a melt processing zone, as a bottle preform, or in the form of a stretch blow molded bottle or other articles.

2) Blend of LMW and HMW Oxidizable Polyether-Based Additives

In preferred embodiments, oxidizable polyether-based additives according to the present invention include the general structure of:

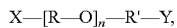

wherein R is a substituted or unsubstituted alkylene chain having from 2 to 10 carbon atoms (such as ethylene, propylene, butylene, 1,4-tetramethylene, etc.);

n ranges from 3 to 100;

X and Y are selected from H, OH, —OCOR$_1$ groups, —OCOAr$_1$, —OR$_1$, and —OAr$_1$ groups, where R$_1$ is an alkyl group (such as methyl, ethyl, propyl and so on up to C18) and Ar is an aryl group (such as an unsubstituted or substituted phenyl, naphthyl, etc.); and R' may be the same as R or selected from the group consisting of —[COR$_2$COOR$_3$O]$_p$— and —[COAr$_2$COOR$_3$O]—, wherein Ar$_2$ is a phenylene or naphthylene group, R$_2$ and R$_3$ are C$_2$ to C$_{18}$ alkylene groups, and p ranges from 10 to 100.

As used herein, the term "alkyl" refers to a substituted or unsubstituted aliphatic hydrocarbon chain. Alkyl groups have straight and branched chains. In some embodiments, alkyls have from 1 to 12 carbon atoms or 1 to 6 carbon atoms, unless explicitly specified otherwise. Alkyl groups include, but are not limited to methyl, ethyl, propyl, isopropyl, butyl, 1-butyl and t-butyl. Specifically included within the definition of "alkyl" are those aliphatic hydrocarbon chains that are optionally substituted.

As used herein, the term "aryl" is defined herein as an aromatic carbocyclic moiety of up to 20 carbon atoms. In some embodiments, aryl groups have 6-20 carbon atoms or 6-14 carbon atoms. Aryls may be a single ring (monocyclic) or multiple rings (bicyclic, up to three rings) fused together or linked covalently. Any suitable ring position of the aryl moiety may be covalently linked to the defined chemical structure. Aryl groups include, but are not limited to, phenyl, 1-naphthyl, 2-naphthyl, dihydronaphthyl, tetrahydronaphthyl, biphenyl, anthryl, phenanthryl, fluorenyl, indanyl, biphenylenyl, acenaphthenyl, and acenaphthylenyl. In some embodiments, phenyl is a preferred aryl. Aryl groups may also be optionally substituted with one or more substituents.

Optional substituents for alkyl, alkenyl, or aryl groups are well known to those skilled in the art. These substituents include alkyl, alkoxy, aryloxy, hydroxy, acetyl, cyano, nitro, glyceryl, and carbohydrate, or two substituents taken together may be linked as an alkylene group to form a ring.

The preferred polyether based additives are selected from:
(1) polyether diols (also known as polyols) such as polyethylene glycol, polypropylene glycol, polytetramethylene ether glycol (PTMEG), of which PTMEG is preferred;
(2) ester end-capped derivatives of polyether diols (i.e., α,ω-polyether diesters), of which PTMEG diesters are preferred, and PTMEG dibenzoate or dioctaoate are most preferred
(3) polyether-polyester block copolymers such as PTMEG-b-PET, PTMEG-b-PBT copolymers, of which PTMEG-b-PET copolymer in which the PTMG content is at least 40 wt. % is preferred; and
(4) ether end-capped derivatives of polyetherdiols (e.g., μ,w-polyether diethers) of which PTMEG diethers are preferred, and PTMEG-μ,w-dimethyl ether or PTMEG-μ,w-diethyl ether are the most preferred.

According to the present invention, a blend of at least two oxygen scavenging compounds selected from the group consisting of the above (1) to (4), i.e., at least one polyether diol, at least one ester end-capped derivative of polyether diol, at least one polyether-polyester block copolymer, and at least one ether end-capped derivative of polyetherdiol, and, in particular, when one component is at a high molecular weight ("OS1") and the other component is a low molecular weight ("OS2"), produces a container that has significantly improved impact strength.

In preferred embodiments, the high molecular weight oxgygen scavenger OS1 has a number average molecular weight ($M_N$) of from about 10,000 to about 100,000, more preferably from about 15,000 to about 75,000, and most preferably from about 20,000 to about 50,000.

In preferred embodiments, the low molecular weight oxygen scavenger OS2 has a number average molecular weight ($M_N$) of from about 200 to about 5,000 more preferably from about 400 to about 2900, and most preferably from about 650 to about 2,000.

In one example, the blend of at least two oxygen scavenging compounds selected from the group consisting of the above (1) to (4) can be a polyether-polyester block copolymer and an ether end-capped derivative of a polyetherdiol, wherein one of the polyether-polyester block copolymer and the ether end-capped derivative of a polyetherdiol is OS1 and the other is OS2.

In another example, the blend of at least two oxygen scavenging compounds selected from the group consisting of the above (1) to (4) can be a polyether-polyester block copolymer and a polyether diol such as, for example, PTMEG, wherein one of the polyether-polyester block copolymer and the polyether diol is OS1 and the other is OS2.

In another example, the blend of at least two oxygen scavenging compounds selected from the group consisting of the above (1) to (4) can be a polyether-polyester block copolymer and an ester end-capped derivatives of a polyether diol, wherein one of the polyether-polyester block copolymer and the ester end-capped derivative of a polyether diol is OS1 and the other is OS2.

In another example, the blend of at least two oxygen scavenging compounds selected from the group consisting of the above (1) to (4) can be an ester end-capped derivative of a polyether diol and an ether end-capped derivative of a polyether diol, wherein one of the ester end-capped derivative of a polyether diol and the ether end-capped derivative of a polyether diol is OS1 and the other is OS2.

In yet another example, the blend of at least two oxygen scavenging compounds selected from the group consisting of the above (1) to (4) can be an ester end-capped derivative of a polyether diol and a polyether diol, wherein one of the ester end-capped derivative of a polyether diol and the polyether diol is OS1 and the other is OS2.

In a preferred embodiment, the blend of at least two oxygen scavenging compounds are a polyether-polyester block copolymer and a polyether diol. Preferably, the polyether-polyester block copolymer is a poly(tetramethylene ether)-b-PET block copolymer (PTMEG-b-PET) and the polyether diol is PTMEG. Preferably, the PTMEG-b-PET is OS1 and has a molecular weight of from about 20,000 to about 50,000 and the PTMEG is OS2 and has a molecular weight of from about 650 to about 2000.

In an embodiment where a PET container such as a bottle is made from the blend of at least two oxygen scavenging compounds selected from the group consisting of the above (1) to (4), the blend may include at least 0.3% and up to about 5 wt. % of the bottle, preferably at least 0.5 wt. %. For example, an exemplary bottle may include about 1 wt. % of the polyether-based blend. If the bottle is a monolayer bottle having a single wall made of the composition, the composition may include up to about 2 wt. % of the polyether-based blend, preferably at least about 0.5 wt. %. For example, an exemplary monolayer bottle may include about 1 wt. % of the polyether-based blend. In another example, an exemplary monolayer bottle may include from about 0.5% to about 1.5 wt. % of the polyether-based blend.

The weight fraction of OS2/[OS1+OS2] may vary between 0.01 to 0.9, more preferably between 0.03 to 0.5 and most preferably between 0.05 to 0.35.

3) Transition Metal Salt

The instant compositions include as an oxidation catalyst a transition metal salt including a metal in a positive oxidation state. It should be noted that it is contemplated that one or more such metals may be used. The transition metal functions to catalyze or promote the oxidation of the organic oxidizable component (i.e., the reaction of the oxidizable polyether-based additive with molecular oxygen).

The transition metal can be selected from the first, second, or third transition series of the Periodic Table. The metal can be Rh, Ru, or one of the elements in the series of Sc to Zn (i.e., Sc, V, Cr, Mn, Fe, Co, Ni, Cu, and Zn). In some embodiments, cobalt is added in +2 or +3 oxidation state. In some embodiments, it is preferred to use cobalt in the +2 oxidation state. In certain embodiments, copper in the +2 oxidation state is utilized. In some embodiments, rhodium in the +2 oxidation state is used. In certain embodiments, zinc may also be added to the composition. Preferred zinc compounds include those in a positive oxidation state.

Suitable counter-ions to the transition metal cations include carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, chlorides, dioxides, hydroxides, nitrates, phosphates, sulfates, or silicates among others.

In a preferred embodiment, the transition metal catalyst is selected from any cobalt carboxylate salt, preferably cobalt salts of $C_2$ to $C1_8$ carboxylic acids. Most preferably, the transition metal catalyst is a pastille-form cobalt neodecanoate composed of a mixture of cobalt propionate and cobalt neodecanoate.

In some embodiments, the composition has a transitional metal concentration of about 5 ppm to about 200 ppm, preferably about 10 ppm to about 100 ppm, and most preferably about 15 ppm to about 60 ppm. The exact amount of transition metal used in an application can be determined by trials that are well within the skill level of one skilled in the art.

The transition metal or metals may be added neat or in a carrier (such as a liquid or wax) to an extruder or other device for making the article, or the metal may be present in a concentrate or carrier with the oxidizable organic component, in a concentrate or carrier with a base polymer, or in a concentrate or carrier with a blend of the base polymer and oxidizable polyether-based additive. Alternatively, at least a portion of the transition metal may be added as a polymerization catalyst to the melt phase reaction for making the base polymer (a polyester polymer in some embodiments) and be present as residual metals when the polymer is fed to the melting zone (e.g. the extrusion or injection molding zone) for making the article such as a preform or sheet. It is desirable that the addition of the transition metal does not substantially increase the IV of the melt in the melt processing zone. Thus, transition metal or metals may be added in two or more stages, such as once during the melt phase for the production of the polyester polymer and again once more to the melting zone for making the article.

The amounts of the components used in the oxygen scavenging formulations of the present invention can affect the use and effectiveness of this composition. Thus, the amounts of polyester base polymer, oxidizable polyether-based additive, and transition metal salt can vary depending on the desired article and its end use. For example, a primary function of the organic oxidizable components detailed above is to react irreversibly with oxygen during the scavenging process, while a primary function of the transition metal catalyst is to facilitate this process. Thus, to a large extent, the amount of the organic oxidizable component present affects the oxygen scavenging capacity of the composition, i.e., the amount of oxygen that the composition can consume, while the amount of transition metal catalyst affects the rate at which oxygen is consumed as well as the induction period.

The oxygen scavenger composition of the present invention can be incorporated in packaging articles having various forms. Suitable articles include, but are not limited to, flexible sheet films, flexible bags, pouches, semi-rigid and rigid containers such as bottles (e.g., PET bottles) or metal cans, or combinations thereof.

Typical flexible films and bags include those used to package various food items and may be made up of one or a multiplicity of layers to form the overall film or bag-like packaging material. The oxygen scavenger composition of the present invention can be used in one, some or all of the layers of such packaging material.

Typical rigid or semi-rigid articles include plastic, paper or cardboard containers, such as those utilized for juices, soft drinks, as well as thermoformed trays or cup normally having thickness in the range of from about 100 micrometers to about 1000 micrometers. The walls of such articles can comprise single or multiple layers of materials. The articles can also take the form of a bottle or metal can, or a crown, cap, crown or cap liner, plastisol or gasket. The oxygen scavenger composition of the present invention can be used as an integral layer or portion of, or as an external or internal coating or liner of, the formed semi-rigid or rigid packaging article. As a liner, the oxygen scavenger composition can be extruded as a film along with the rigid article itself, in, e.g., a coextrusion, extrusion coating, or extrusion lamination process, so as to form the liner in situ during article production; or alternatively can be adhered by heat and/or pressure, by adhesive, or by any other suitable method to an outer surface of the article after the article has been produced.

In one preferred embodiment of the present invention, the composition of the present invention, i.e., a polyester base polymer, a transition metal in a positive oxidation state, and a blend of oxidizable polyether-based additives as described above can be employed to form a monolayer bottle. In another preferred embodiment of the present invention, the composition of the present invention can form one layer of a multilayer bottle.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

The composition may also include other components such as pigments, fillers, crystallization aids, impact modifiers, surface lubricants, denesting agents, stabilizers, ultraviolet light absorbing agents, metal deactivators, nucleating agents such as polyethylene and polypropylene, phosphite stabilizers and dyestuffs. Other additional components are well known to those skilled in the art and can be added to the existing composition so long as they do not negatively impact the performance of the compositions. Typically, the total quantity of such components will be less than about 10% by weight relative to the total composition. In some embodiments, the amount of these optional components is less than about 5%, by weight relative to the total composition.

A common additive used in the manufacture of polyester polymer compositions used to make stretch blow molded bottles is a reheat additive because the preforms made from the composition must be reheated prior to entering the mold for stretch blowing into a bottle. Any of the conventional reheat additives can be used, such additives include various forms of black particles, e.g. carbon black, activated carbon, black iron oxide, glassy carbon, and silicon carbide; and other reheat additives such as silicas, red iron oxide, and so forth.

In many applications, not only are the packaging contents sensitive to the ingress of oxygen, but the contents may also be affected by UV light. Fruit juices and pharmaceuticals are two examples of such contents. Accordingly, in some embodiments, it is desirable to incorporate into the polyester composition any one of the known UV-absorbing compounds in amounts effective to protect the packaged contents.

The instant compositions can be made by mixing a polyester base polymer, a transition metal in a positive oxidation state, and a blend of oxidizable polyether-based additives as described above. Such compositions can be made by any method known to those skilled in the art. In certain embodiments, some or part of the transition metal of the transition metal catalyst may exist in the base polymer prior to mixing. This residual metal, for example, can exist from the manufacturing process of the base polymer. In some embodiments, the polyester base polymer, transition metal in a positive oxidation state, and blend of oxidizable polyether-based additives as described above are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior melt processing the composition to form an article. In some embodiments, the mixing can be just prior to the melt process zone. In other embodiments, one or more ingredients can be premixed in a separate step prior to bringing all of the ingredients together.

In some embodiments, the invention concerns use of the compositions described herein as a component of a wall that is used in a package for oxygen sensitive materials. The necessary scavenging capacity of a package will generally have to be greater for walls that have a greater permeance in the absence of scavenging additives. Accordingly, a good effect is harder to achieve with inherently higher permeance materials are used.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

When the instant compositions are used in a wall or as a layer of a wall, the permeability of the composition for oxygen is advantageously not more than about 3.0, or not more than about 1.7, or not more than about 0.7, or not more than about 0.2, or not more than about 0.03 cm$^3$ mm/(m$^2$ atm day). The permeability of the composition provided by the present invention is advantageously not more than about three-quarters of that in the absence of oxygen-scavenging properties. In some embodiments, the permeability is not more than about one half, one-tenth in certain embodiments, one twenty-fifth in other embodiments, and not more than one-hundredth in yet other embodiments of that in the absence of oxygen-scavenging properties. The permeability in the absence of oxygen-scavenging properties is advantageously not more than about 17, or not more than about 10, or not more than about 6 cm$^3$ mm/(m$^2$ atm day). A particularly good effect can be achieved for such permeabilities in the range from about 0.5, or about 1.0, to 10, or about 6.0, cm$^3$ mm/(m$^2$ atm day). Measuring oxygen permeation can be performed by one of ordinary skilled in the art employing oxygen permeation (OTR) instrumentation such as, for example, OX-TRAN® instruments available from MOCON, Inc. (Minneapolis, Minn.).

The above-described permeabilities are achieved without an induction period, which, in practical terms means that such permeabilities are achievable immediately after the container is formed.

In another aspect, the instant composition can be used as a master batch for blending with a polymer or a polymer containing component. In such compositions, the concentration of the oxidizable polyether-based additive and the transition metal catalyst will be higher to allow for the final blended product to have suitable amounts of these components. The master batch may also contain an amount of the polymer to which the master batch is to be blended with. In other embodiments, the master batch may contain a polymer that is compatible with the polymer to which the master batch is to be blended.

In yet another aspect, the compositions of the instant invention can be used for forming a layer of a wall which primarily provides oxygen-scavenging (another layer including polymer providing gas barrier without significant scavenging), or as a head-space scavenger (completely enclosed, together with the package contents, by a package wall). Such techniques are well know to those skilled in the art.

The time period for which the permeability is maintained can be extended by storing the articles in sealed containers or under an inert atmosphere such as nitrogen prior to use with oxygen sensitive materials.

In another aspect, the invention provides a package, whether rigid, semi-rigid, collapsible, lidded, or flexible or a combination of these, comprising a wall as formed from the compositions described herein. Such packages can be formed by methods well known to those skilled in the art.

Among the techniques that may be used to make articles are moulding generally, injection moulding, stretch blow moulding, extrusion, thermoforming, extrusion blow moulding, and (specifically for multilayer structures) co-extrusion and lamination using adhesive tie layers. Orientation, e.g., by stretch blow moulding, of the polymer is especially attractive with phthalate polyesters because of the known mechanical advantages that result.

The melt processing zone for making the article can be operated under customary conditions effective for making the intended articles, such as preforms, bottles, trays, and other articles mentioned below. In one embodiment, such conditions are effective to process the melt without substantially increasing the IV of the melt and which are ineffective to promote transesterification reactions. In some preferred embodiments, suitable operating conditions effective to establish a physical blend of the substantially antimony-free polyester polymer, oxidizable polyether-based additive, and transition metal catalyst are temperatures in the melt processing zone within a range of about 250° C. to about 300° C. at a total cycle time of less than about 6 minutes, and typically without the application of vacuum and under a positive pressure ranging from about 0 psig to about 900 psig. In some embodiments, the residence time of the melt on the screw can range from about 1 to about 4 minutes.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (prevent vitamin degradation), or color of the drink. The compositions of the instant invention are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions of the instant invention also find use in the manufacture of cosmetic containers and containers for pharmaceuticals or medical devices.

The package walls of the instant invention can be a single layer or a multilayer construction. In some embodiments using multilayer walls, the outer and inner layers may be structural layers with one or more protective layers containing the oxygen scavenging material positioned there between. In some embodiments, the outer and inner layers comprise and polyolefin or a polyester. In certain embodiments, a single layer design is preferred. Such a layer may have advantages in simplicity of manufacture and cost.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

As used herein, the terms "a", "an", "the" and the like refer to both the singular and plural unless the context clearly indicates otherwise. "A bottle", for example, refers to a single bottle or more than one bottle.

Also as used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

Where a range of numbers is presented in the application, it is understood that the range includes all integers and fractions thereof between the stated range limits. A range of numbers expressly includes numbers less than the stated endpoints and those in-between the stated range. A range of from 1-3, for example, includes the integers one, two, and three as well as any fractions that reside between these integers.

As used herein, "master batch" refers to a mixture of base polymer, oxidizable organic component, and transition metal that will be diluted, typically with at least additional base polymer, prior to forming an article. As such, the concentrations of oxidizable organic component and transition metal are higher than in the formed article.

The following examples are included to demonstrate preferred embodiments of the invention regarding the usefulness of a blend of a polyester base polymer, a transition metal in a positive oxidation state, and a blend of oxidizable polyether-based additives as described above to make oxygen scavenging, clear PET containers which exhibit no induction period. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

In the following examples, various compositions of PET resin blended with mixtures of oxidizable polyether-based additives, and/or transition metal catalysts were fabricated into monolayer bottles via a 2-step process. In the $1^{st}$ step, each composition was directly fed and melt-blended in an injection molding machine and then molded into the preforms. In a $2^{nd}$ step, the preforms were reheated and stretch blow molded into the final shaped containers such as bottles.

The monolayer preforms were made on a single cavity, 2003 Battenfeld A800/200H/125HC injection molding machine. The blended composition was fed into the throat of the injection molding extruder heated to 260-270° C. The molten blend was then injection molded into a single cavity preform mold, such as a 30 g, 33 mm finish 20 oz. ketchup bottle preform, to form the monolayer bottle preform. The cycle time for molding was about 30 sec. The preforms were then reheat-stretch-blow molded into monolayer bottles. The bottles were generally stretch blown on a Sidel SBO-1 machine set to run at a rate of ca. 800 bottles per hour. In this process, the preforms were typically heated to a surface temperature of 99° C. prior to the blowing operation. The blow mold temperature was about 12° C. The blow pressures were about 33 bar. Clear monolayer PET blend bottles were thus obtained.

Drop Impact Testing of Oxygen Scavenging PET Bottles:

Typically 5 to 10 ketchup bottles of each composition of examples in Table 1, were evaluated in these drop tests. Each bottle was flood filled within ½" from the top with room temperature water and capped securely. One at a time, each upright bottle is dropped flat through a guide tube straight down from 3 feet onto a steel plate. The base of the bottle first impacts onto the plate. The bottles are inspected and noted for degree of impact damage. Any visible damage (even a minor blistering or apparent delamination) was considered as a failure. The number of drop impact failures are noted as % failures in Table 1.

The bottle clarity/haze measurement was made by using a standard Hunter LAB spectrophotometer method (ASTM D10003).

The oxygen scavenging performance of all the PET bottles from examples in Table 1, were evaluated using an Oxysense 4000B instrument with OxyDot oxygen sensors (available from OxySense Inc. Dallas, Tex. 752543, USA), for the measurement of oxygen ingress/oxygen content with time. Typically the OxyDots were attached to the inside middle portion of each test bottle. Each bottle is then loaded on an orbisphere bench top filler and after an initial flushing with nitrogen, it is filled with deoxygenated water ($O_2$ content <100 ppb) and capped. After several bottles of each composition have been filled and sealed, they are stored under ambient conditions for a required shelf-life test period while the oxygen content or ingress in the bottles is measured. To make the measurements, the fiber optic pen of the instrument was aligned with the OxyDot (from the outside of the bottle), making sure that the tip of the pen was making contact with the bottle. Then the capture button was pressed to obtain the oxygen concentration in the bottle. The oxygen concentration was measured periodically with time.

Comparative Example 1

A dry blend of an antimony-free PET resin (Laser+HS Ti818, DAK America), herein after referred to as PET (Ti818), with 1 wt % of poly(tetramethylene ether)-PET block copolymer (Oxyclear® 3500, Auriga Polymer Inc.), hereinafter referred to as high MW "OS1" additive and 1 wt. % of a cobalt masterbatch in PET (Oxyclear® 2700, Auriga Polymers Inc, 1500 ppm Co) was made. This blend contains a total of 45 ppm cobalt (30 ppm of built-in Co from Ti818+15 ppm Co from the added 1% Oxyclear 2700) which serves the function of catalyst for the oxygen scavenging. This dry blend was directly injection molded into preforms which were subsequently blown into monolayer 20 oz. ketchup bottles (512 ml volume, 0.04 cm sidewall thickness), using the 2 step process described before. The bottles were tested for the drop impact performance, haze measurement and oxygen scavenging performance using the corresponding methods described earlier. The 3 ft bottle drop test and haze data is shown in Table 1. The oxygen ingress data for this example is shown in FIG. 1. It may be noted that the bottles exhibited excellent oxygen scavenging performance, low haze but suffered from drop impact failures of ca. 20%.

Comparative Example 2

A dry blend of PET resin (Laser+HS Ti818, DAK America), well mixed with 0.5 wt % poly(tetramethylene ether) glycol (PTMEG) of MW=1400 (Polymeg® 1400, Invista), hereinafter referred to as oligomeric "OS2(A)" additive and 0.05 wt. % of PMDA (pyromelltic dianhydride, Sigma Aldrich), was first made. This blend contains about 30 ppm Co (from the Ti818 resin used) which serves as oxygen scavenging catalyst. No additional Co masterbatch (i.e., Oxyclear 2700) was used. This physical blend was then melt-mixed 'in-situ' in the injection molding machine and directly injection molded into preforms which were subsequently blown into monolayer 20 oz. ketchup bottles (512 ml volume, 0.04 cm sidewall thickness), via the 2 step process described earlier. The bottles were tested for the drop impact performance, haze and oxygen scavenging performance using the corresponding methods described earlier. The 3 ft bottle drop test and haze data is shown in Table 1. The oxygen ingress data for this example is shown in FIG. 1. It may be noted that the bottles exhibited excellent oxygen scavenging performance, good drop impact resistance but suffered from high haze (11.4).

Comparative Example 3

A blend of PET resin (Laser+HS Ti818, DAK America), well mixed with 0.5 wt % poly(tetramethylene ether) glycol (PTMEG) of MW=650 (Polymeg® 650, Invista), hereinafter referred to as oligomeric "OS2(B)" additive and 0.05 wt. % of PMDA (pyromelltic dianhydride, Sigma Aldrich), was made. This blend contains about 30 ppm Co (from the Ti818 resin used) which serves as oxygen scavenging catalyst. No additional Co masterbatch (i.e., Oxyclear 2700) was used. This physical blend was then melt-mixed 'in-situ' in the injection molding machine and directly injection molded into preforms which were subsequently blown into monolayer 20 oz. ketchup bottles (512 ml volume, 0.04 cm sidewall thickness), via the 2 step process described earlier. The bottles were tested for the drop impact performance, haze and oxygen scavenging performance using the corresponding methods described earlier. The 3 ft bottle drop test and haze data is shown in Table 1. The oxygen ingress data for this example is shown in FIG. 1. It may be noted that the bottles exhibited excellent oxygen scavenging performance, good drop impact resistance but suffered from high haze (11.5).

Example 1

A blend of PET (Ti818) with 0.9 wt % of "OS1" additive and 0.05 wt. % "OS2" additive and 1 w % of cobalt masterbatch (Oxyclear® 2700) was directly melt mixed and injection molded into monolayer preforms which were subsequently blown into monolayer 20 oz. ketchup bottles (512 ml volume, 0.04 cm sidewall thickness), using the 2 step process described before. This blend composition contains a total of 45 ppm Cobalt (30 ppm of built-in Co from Ti818+15 ppm Co from the added 1% Oxyclear 2700) which serves as catalyst for the oxygen scavenging. The bottles from this example were tested for the drop impact performance, haze measurement and oxygen scavenging performance using the corresponding methods described earlier. The 3 ft bottle drop test and haze data is shown in Table 1 and the oxygen scavenging data in FIG. 1. It may be noted that the bottles exhibited not only excellent oxygen scavenging and low haze but also excellent impact resistance with no failures in 3 ft drop tests.

Example 2

In this example, a blend of PET (Ti818) with 0.7 wt % of "OS1" additive and 0.15 wt. % "OS2(A)" additive and 1 w % of cobalt masterbatch (Oxyclear® 2700) was directly injection molded into preforms which were subsequently blown into monolayer 20 oz. ketchup bottles as described above. The blend composition of these bottles contains a total of 45 ppm Cobalt (30 ppm of built-in Co from Ti818+15 ppm Co from the added 1% Oxyclear 2700) which serves as the catalyst for the oxygen scavenging. The 3 ft bottle drop test and haze data is shown in Table 1 and the oxygen scavenging data in FIG. 1. It may be noted that the bottles exhibited not only excellent oxygen scavenging and low haze but also excellent drop impact resistance with no failures in 3 ft drop tests.

Example 3

In this example, a blend of PET (Ti818) with 0.5 wt % of "OS1" additive and 0.25 wt. % "OS2(A)" additive and 1 w % of cobalt masterbatch (Oxyclear® 2700) was directly injection molded into preforms which were subsequently blown into monolayer 20 oz. ketchup bottles as described above. The blend composition of these bottles contains a total of 45 ppm Cobalt (30 ppm of built-in Co from Ti818+15 ppm Co from the added 1% Oxyclear 2700) which serves as the catalyst for the oxygen scavenging. The 3 ft bottle drop test and haze data is shown in Table 1 and the oxygen scavenging data in FIG. 1. It may be noted that the bottles exhibited not only excellent oxygen scavenging and low haze but also excellent impact resistance with no failures in 3 ft drop tests Example 4

In this example, a blend of PET (Ti818) with 0.7 wt % of "OS1" additive, 0.15 wt. % "OS2(B)" additive and 0.05 wt. % of PMDA was melt blended and injection molded into preforms which were subsequently blown into monolayer 20 oz. ketchup bottles. The bottles exhibited a combination of good oxygen scavenging, low haze and excellent drop impact resistance with no failures in 3 ft drop tests.

Example 5

In this example, a blend of PET (Ti818) with 0.5 wt % of "OS1" additive, 0.25 wt. % "OS2(B)" additive and 0.05 wt. % of PMDA was melt blended and injection molded into preforms which were subsequently blown into monolayer 20 oz. ketchup bottles. The bottles exhibited a combination of good oxygen scavenging, low haze and excellent drop impact resistance with no failures in 3 ft drop tests.

TABLE 1

Examples of Oxygen scavenging compositions of this invention with a mixture of 2 polyether-based oxygen scavenger additives in PET.

| Example # | OS1 (w %) | OS2 (A) (w %) | OS2 (B) (w %) | PMDA (w %) | % Bottles delaminated (3 ft. drop test) | Haze |
|---|---|---|---|---|---|---|
| Comp. Ex. 1 | 1 | 0 | — | 0 | 20 | 3.6 |
| Comp. Ex. 2 | — | 0.5 | — | 0.05 | 0 | 11.4 |
| Comp. Ex. 3 | — | — | 0.5 | 0.05 | 0 | 11.5 |
| Example 1 | 0.9 | 0.05 | — | 0 | 0 | 3.0 |
| Example 2 | 0.7 | 0.15 | — | 0 | 0 | 3.3 |
| Example 3 | 0.5 | 0.25 | — | 0 | 0 | 4.0 |
| Example 4 | 0.7 | — | 0.15 | 0.05 | 0 | 6.0 |
| Example 5 | 0.5 | — | 0.25 | 0.05 | 0 | 6.1 |

OS1 ("High MW, oxygen scavenging additive"): Poly(tetramethylene ether)-PET block copolymer (Oxyclear® 3500, Auriga Polymers Inc), IV: 1.2; MW ≥ 20,000
OS2 (A) ["Low MW oxygen scavenging additive A"]: Poly(tetramethylene ether) glycol (PTMEG) of MW = 1400 (Polymeg® 1400, Invista).
OS2 (B) ["Low MW oxygen scavenging additive B"]: Poly(tetramethylene ether) glycol (PTMEG) of MW = 650 (Polymeg® 650, Invista).
PMDA: Pyromellitic dianhydride, a PET chain extender
PET: PET resin (Laser + HS Ti818, DAK America), made by a Ti-based polymerization catalyst (i.e., substantially antimony-free) with about 30 ppm built-in Cobalt as a color neutralizer, which advantageously served in our inventive compositions as an oxygen scavenging catalyst.

Polypropylene Base Polymer

The dual oxygen scavengers of the present invention can also be employed with a polypropyle container or film. Since, however, polypropylene has an oxygen transmission rate that is about 15× higher than PET, then for a polypropylene base polymer, approximately 15× the scavengers needs to be added to get equivalent shelf life relative to PET.

For example, PET ketchup bottles having a 15-20 mil thickness will need about 0.75 wt. % of the oxygen scavengers of the present invention to achieve an 18 month shelf life. The same containers made with thermoformed polypropylene will require at least 10×, i.e., 7.5 wt. % of the oxygen scavengers of the present invention to achieve an 18 month shelf life. If a 6 month shelf life is adequate, then only 2.5% of the oxygen scavengers of the present invention is needed in the polypropylene system.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

We claim:
1. A composition comprising:
a polyester base polymer;
a blend of two distinct polyether-based oxygen scavenging additives, OS1 and OS2, wherein each of OS1 and OS2 is selected from the group consisting of a polyether diol, an ester end-capped derivative of a polyether diol, a polyether-polyester block copolymer, and an ether end-capped derivative of a polyether diol, wherein OS1 has a number average molecular weight ($M_N$) from 10,000 to 100,000 and OS2 has a number average molecular weight ($M_N$) from 200 to 5,000; and
a transition metal catalyst.
2. The composition of claim 1, wherein the polyester base polymer comprises polyethylene terephthalate.
3. The composition of claim 1 wherein OS1 has a number average molecular weight ($M_N$) from 15,000 to 75,000 and OS2 has a number average molecular weight ($M_N$) from 400 to 2,900.
4. The composition of claim 3 wherein OS1 has a number average molecular weight ($M_N$) from 20,000 to 50,000 and OS2 has a number average molecular weight ($M_N$) from 650 to 2,000.

5. The composition of claim 1 wherein OS1 is a polyether-polyester block copolymer.

6. The composition of claim 1 wherein OS1 is a polyether-polyester block copolymer and OS2 is a polyether diol selected from the group consisting of polyethylene glycol, polypropylene glycol, and polytetramethylene ether glycol (PTMEG).

7. The composition of claim 6 wherein OS2 is PTMEG polytetramethylene ether glycol.

8. The composition of claim 7 wherein the polyether-polyester block copolymer has a number average molecular weight ($M_N$) from 20,000 to 50,000 and the polytetramethylene ether glycol has a number average molecular weight ($M_N$) from 650 to 2000.

9. The composition of claim 1 wherein the polyether diol is selected from the group consisting of polyethylene glycol, polypropylene glycol, and polytetramethylene ether glycol (PTMEG).

10. The composition of claim 1 wherein the ester end-capped derivative of a polyether diol is selected from the group consisting of PTMEG dibenzoate and PTMEG dioctaoate.

11. The composition of claim 10 wherein the polyether-polyester block copolymer is selected from the group consisting of PTMEG-b-PET and PTMEG-b-PBT.

12. The composition of claim 11 wherein the ether end-capped derivative of polyetherdiol is selected from the group consisting of PTMEG-μ,w-dimethyl ether and PTMEG-μ,w-diethyl ether.

13. The composition of claim 1, wherein the polyester base polymer contains less than 10 ppm of antimony.

14. The composition of claim 13, wherein the polyester base polymer contains less than 40 ppm of phosphorous.

15. The composition of claim 1, wherein the transition metal catalyst comprises cobalt.

16. The composition of claim 1, wherein the transition metal catalyst comprises a carboxylate salt.

17. The composition of claim 1, wherein the transition metal catalyst comprises cobalt neodecanoate.

18. A composition comprising:
PET;
a blend of polyether-based oxygen scavenging additives comprising PTMEG-b-PET copolymer having a number average molecular weight ($M_N$) from 20,000 to 50,000 and PTMEG having a number average molecular weight ($M_N$) from 650 to 2,000; and
a transition metal catalyst comprising cobalt.

19. A wall for a package comprising:
a polyester base polymer;
a blend of two distinct polyether-based oxygen scavenging additives, OS1 and OS2, wherein each of OS1 and OS2 is selected from the group consisting of a polyether diol, an ester end-capped derivative of a polyether diol, a polyether-polyester block copolymer, and an ether end-capped derivative of a polyether diol, wherein OS1 has a number average molecular weight ($M_N$) from 10,000 to 100,000 and OS2 has a number average molecular weight ($M_N$) from 200 to 5,000; and
a transition metal catalyst.

20. The wall of claim 19, wherein the polyester base polymer comprises polyethylene terephthalate.

21. The wall of claim 19 wherein OS1 has a number average molecular weight ($M_N$) from 15,000 to 75,000 and OS2 has a number average molecular weight ($M_N$) from 400 to 2,900.

22. The wall of claim 21 wherein OS1 has a number average molecular weight ($M_N$) from 20,000 to 50,000 and OS2 has a number average molecular weight ($M_N$) from 650 to 2,000.

23. The wall of claim 19 wherein OS1 is a polyether-polyester block copolymer.

24. The wall of claim 19 wherein OS1 is a polyether-polyester block copolymer and OS2 is a polyether diol selected from the group consisting of polyethylene glycol, polypropylene glycol, and polytetramethylene ether glycol (PTMEG).

25. The wall of claim 24 wherein OS2 is PTMEG polytetramethylene ether glycol.

26. The wall of claim 25 wherein the polyether-polyester block copolymer has a number average molecular weight ($M_N$) from 20,000 to 50,000 and the polytetramethylene ether glycol has a number average molecular weight ($M_N$) from 650 to 2,000.

27. The wall of claim 19 wherein the polyether diol is selected from the group consisting of polyethylene glycol, polypropylene glycol, and polytetramethylene ether glycol (PTMEG).

28. The wall of claim 19 wherein the ester end-capped derivative of a polyether diol is selected from the group consisting of PTMEG dibenzoate and PTMEG dioctaoate.

29. The wall of claim 28 wherein the polyether-polyester block copolymer is selected from the group consisting of PTMEG-b-PET and PTMEG-b-PBT.

30. The wall of claim 29 wherein the ether end-capped derivative of polyetherdiol is selected from the group consisting of PTMEG-μ,w-dimethyl ether and PTMEG-μ,w-diethyl ether.

31. The wall of claim 19, wherein the polyester base polymer contains less than 10 ppm of antimony.

32. The wall of claim 31, wherein the polyester base polymer contains less than 40 ppm of phosphorous.

33. The wall of claim 19, wherein the transition metal catalyst comprises cobalt.

34. The wall of claim 19, wherein the transition metal catalyst comprises a carboxylate salt.

35. The wall of claim 19, wherein the transition metal catalyst comprises cobalt neodecanoate.

* * * * *